April 10, 1956 H. WEBER, JR 2,741,055
FISHING SIGNAL

Filed April 2, 1954 2 Sheets-Sheet 1

INVENTOR.
HARRY WEBER, JR.
BY
McMorrow, Berman + Davidson
ATTORNEYS

April 10, 1956     H. WEBER, JR     2,741,055
FISHING SIGNAL
Filed April 2, 1954
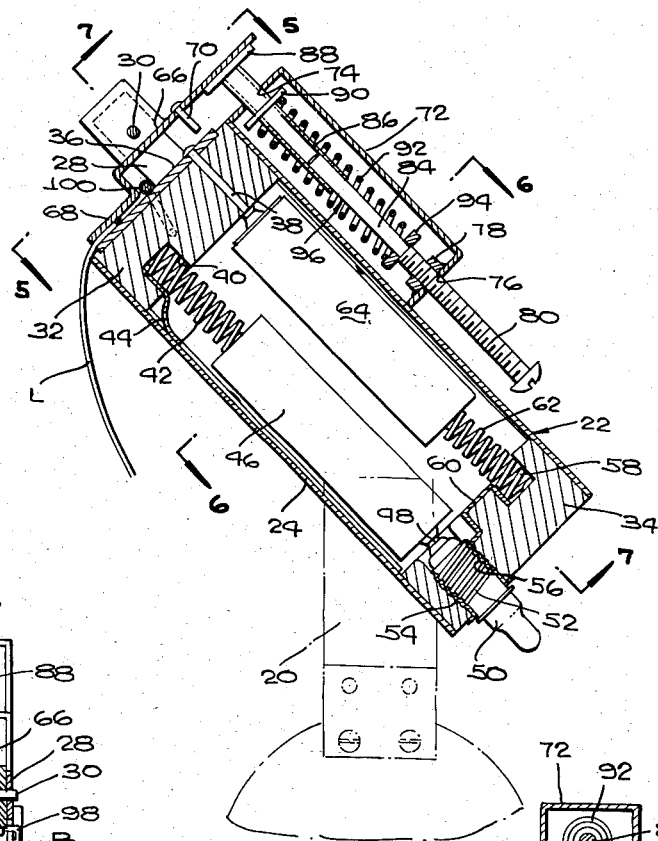
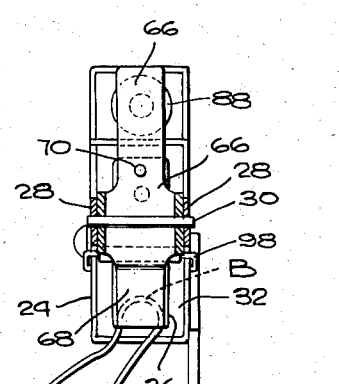
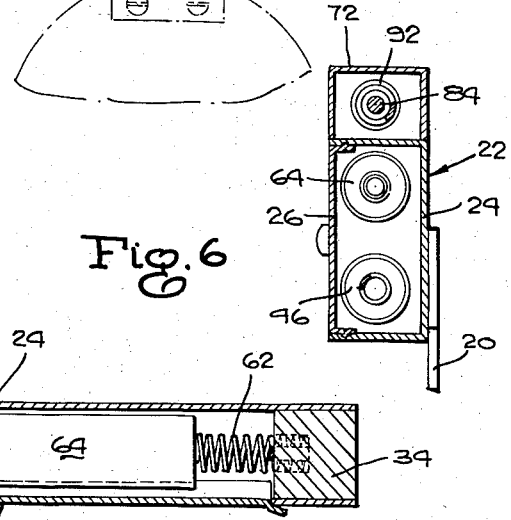
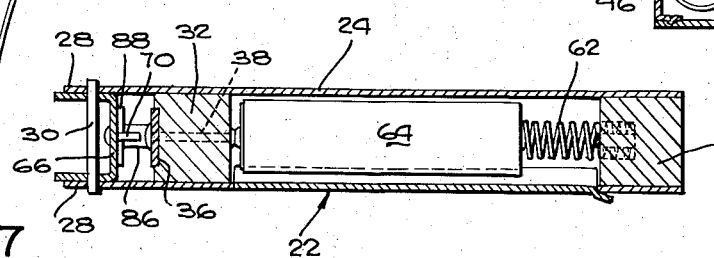
*INVENTOR.*
HARRY WEBER, JR
BY
McMorrow, Berman & Davidson
ATTORNEYS

2,741,055
FISHING SIGNAL

Harry Weber, Jr., Mineola, Kans.

Application April 2, 1954, Serial No. 420,721

1 Claim. (Cl. 43—17)

This invention relates to a fishing signal and has for its primary object to indicate to a fisherman when a fish has taken the hook and started away with it.

Another object is to regulate the pulling effort required on a fishing line to actuate the signal in order to enable the fisherman to select the type of fish that he wishes to catch.

A further object is to provide illumination during the threading of the fishing line into the device.

The above and other objects may be attained by employing this invention which embodies among its features an electrically actuated signal, a source of electrical energy connected to the signal, a second source of electrical energy connected to the signal, a movable contact jaw mounted adjacent the sources of energy to move in an arcuate path, said jaw being electrically connected to the first source of electrical energy, a stationary contact jaw mounted adjacent the movable jaw and in intersecting relation to the arcuate path, said stationary jaw being adapted to support a bight formed in a fishing line in the arcuate path and being eltcrically connected to the second mentioned source of electrical energy, and means mounted adjacent the sources of electrical energy and operatively connected to the movable contact jaw for yieldingly advancing it toward the stationary jaw and into clamping engagement with the bight portion of the line whereby the jaws will be held out of electrical contact until the bight leaves its position between the jaws.

Other features include a contact pin carried by the movable jaw for movement therewith in an arcuate path which is intersected by the stationary jaw and adapted to be manually advanced into contact with the stationary jaw to provide an illumination during the disposition of a fishing line bight between the jaws.

Other features include a telescopic plunger mounted adjacent the sources of electrical energy and engaging the movable jaw, spring means carried by and encircling the telescopic portions of the plunger to hold the plunger expanded under yielding pressure, and a screw connected to the telescopic plunger adjacent the end thereof remote from the movable jaw for regulating the pressure exerted by the spring on the movable jaw.

In the drawings:

Figure 4 is an enlarged longitudinal sectional view through the signalling device;

Figure 5 is a transverse sectional view taken substantially on the line 5—5 of Figure 4;

Figure 6 is a transverse sectional view taken substantially on the line 6—6 of Figure 4; and Figure 7 is a longitudinal sectional view taken substantially on the line 7—7 of Figure 4.

Figure 1:
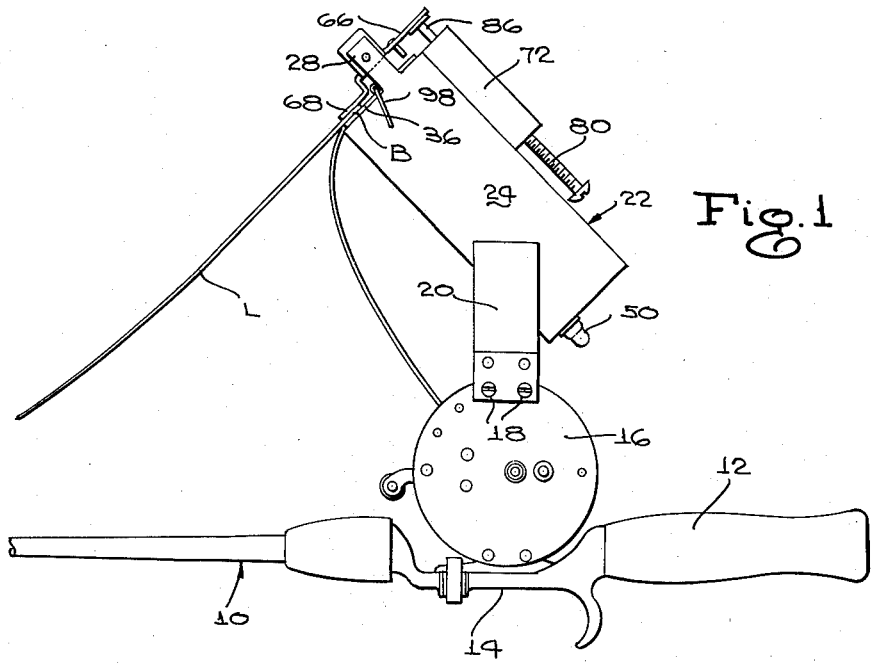
Figure 1 is a side view of a fishing rod and reel showing this signalling device mounted thereon.
Figure 2:
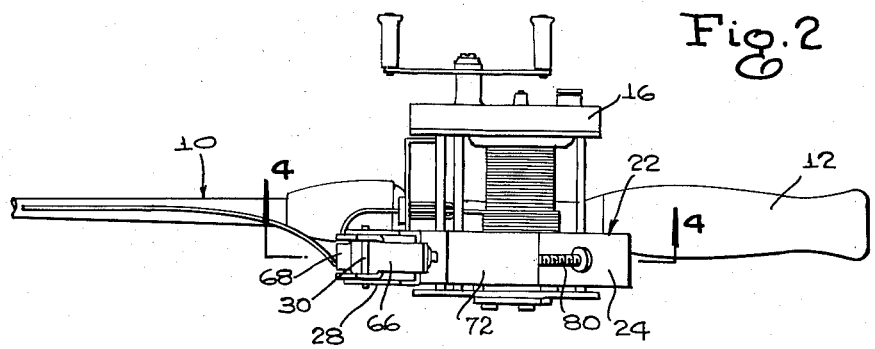
Figure 2 is a top plan view of Figure 1.
Figure 3:
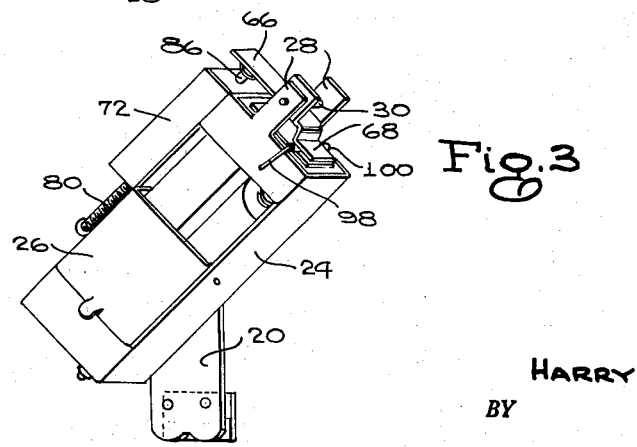
Figure 3 is a perspective view of the signalling device showing a portion of the cover plate broken away more clearly to illustrate certain details of construction.

Referring to the drawings in detail, a conventional fishing pole designated generally 10 is provided with a conventional handle 12 and reel seat 14 in which a conventional fishing reel 16 is mounted. Secured as by screws 18 to the fishing reel 16 is a bracket 20 upon which the signalling device designated generally 22 is supported in active position relative to the fishing pole 10.

The signalling device designated generally 22 comprises a case 24 having an access door 26 opening through one side thereof and carried by the case and projecting longitudinally from one end thereof are spaced parallel ears 28 in which is mounted a pivot pin 30 which extends transversely across one end of the case 24 in spaced parallel relation thereto.

Extending between the walls of the case 24 adjacent the end thereof adjacent the ears 28 is a block 32 of nonconducting material and a similar block 34 of nonconducting material is carried by and closes the opposite end of the case 24, as will be readily understood upon reference to Figures 4 through 7, inclusive. Carried by the outer side of the block 32 is a stationary contact jaw 36 having electrical contact with a pin 38 which extends through the block 32, as will be readily understood upon reference to Figure 4. Entering the block 32 from the interior of the case 24 in spaced parallel relation to the pin 38 is a bore 40 and seated in said bore is a compression coiled spring 42 which has electrical contact with the case 24 through the medium of a conductor 44. A first source of electrical energy 46 is seated on the spring 42 with which it has eltcrical connection and the first source of electrical energy 46 is urged by the spring 42 into electrical contact with the central contact 48 of a signal lamp 50, the contact shell 52 of which threadedly engages an internally screw-threaded contact socket 54 carried by the block 34 in a passage 56 which extends through said block in axial alignment with the bore 40 and the block 32. Opening into the block 34 from the interior of the case 24 and in axial alignment with the contact pin 38 is a recess 58 which lies in spaced parallel relation to the opening 56 and receives one end of a conductor 60 which leads from the threaded contact socket 54 into the recess to establish electrical connection with a compression coil spring 62 which is seated in the recess 58, as will be readily understood upon reference to Figure 4. A second source of electrical energy 64 is seated on the spring 62 and has electrical connection with said spring while the opposite terminal of the source 64 engages the pin 38, as will be readily understood upon reference to Figure 4, to energize the stationary jaw member 36. Mounted for rocking movement on the pivot pin 30 in an arcuate path which intersects the stationary contact jaw member 36 is a rock arm 66 of electrically conductive material which carries at one end a movable contact jaw 68. The opposite end of the rock arm 66 projects longitudinally beyond the stationary contact jaw 36 and carries intermediate its ends a contact pin 70 which, when pressure is applied on the rock arm 66 adjacent the end thereof remote from the contact jaw 68, engages the stationary contact jaw 36 and closes the electrical circuit through the signal 50. Mounted on the case 24 and extending longitudinally along the side thereof remote from the movable contact jaw 68 is a housing 72 having aligned openings 74 and 76 extending through opposite end walls and welded or otherwise secured to the end wall through which the opening 76 extends and in concentric relation to said opening is a nut 78 for the reception of a screw-threaded shank 80 carrying on its end which is disposed within the housing 72 a stem 84 of slightly less diameter than the diameter of the shank 80. Telescopically enclosing the end of the stem 84 remote from the threaded shank 80 is a tubular member 86 which projects through the opening 74 and is provided with a head 88 which bears on the underside of the rock arm 66 adjacent the end thereof remote from the movable jaw member 68. Secured to the tubular member 86 within the housing 72 is a stop washer 90 against which bears one end of a compression coil spring 92 which encircles the tubular sleeve 86 and stem 84 and engages a stop washer 94 carried by the stem 84 adjacent its junction with the threaded shank 80. It will thus be seen that a telescopic plunger designated generally 96 is provided, the components of which are yieldingly urged apart by the spring 92. It will also be seen that because of the bearing of the head 88 on the rock arm 66 and because of the threaded engagement of the threaded stem 80 with the nut 78, the yielding pressure under which the movable contact 68 is advanced toward the stationary contact jaw 36 may be varied according to the desires of the user.

Pivotally coupled to the case 24 adjacent the contact jaw 36 is a bail member 98 carrying an electrical insulator 100 which may be moved with the bail about the axis of its pivotal connection from a position in which the movable contact jaw 68 is held in spaced relation to the stationary contact jaw 36 to a position in which the contact jaw 68 may move under the influence of the spring 92 into engagment with the stationary contact jaw 36. As will be apparent (see Figure 4) from a comparison of the diameter of insulator 100 with the distance between the free end of pin 70 and stationary jaw 36, when the bail is interposed as a spacer between the contacting portions of the jaws, the pin 70 will be held in engagement with stationary jaw 36. Thus, one can prepare the fishing equipment with the light on, while having both hands free.

In use, a fishing line L is provided intermediate its ends with a bight portion B which is disposed on the stationary jaw 36 in such a position that it intersects the path of the movable contact jaw 68. By adjusting the screw 80, the pressure exerted by the spring 92 on the movable contact jaw 68 may be regulated to require a selected pull on the fishing line L in order to move the bight B from its position between the jaws. As a consequence, the fisherman may select the operation of the signal so that it will indicate only when a certain type or size of fish is on the hook. Obviously, as soon as the bight portion B is extracted from its position between the stationary jaw 36 and the movable jaw 68, the spring 92 will cause the movable jaw 68 to engage the stationary jaw 36 and complete the electrical circuit through the signal unit 50. While in the present instance the signal unit 50 is disclosed as an electric lamp, it is obvious that an audible signal may be substituted therefor or a combination visual and audible signal may be employed. It is also obvious that the pressure of the spring 92 may be adjusted to suit varying requirements.

While in the foregoing there has been shown and described the preferred embodiment of this invention, it is to be understood that minor changes in the details of construction, combination and arrangement of parts may be resorted to without departing from the spirit and scope of the invention as claimed.

What is claimed is:

A fishing signal comprising a case, an electrically actuable signal element mounted thereon; a source of electrical energy carried by the case; a contact jaw movably mounted on the case; means carried by the case resiliently and yieldably biasing the jaw in one direction; a stationary contact jaw mounted on the case in position for contacting one face thereof by one face of the movable jaw when when the movable jaw is biased in said direction, the signal element, source, and jaws being electrically connected in a circuit closed by the engagement of the jaws with each other, the contacting faces of the jaws being flat over their full areas and lying in substantially parallel planes, for disposition of a bight portion of a fishing line therebetween as a spacer normally holding the jaws out of contact while frictionally gripped by the jaws under the pressure of said means; electrically conductive means projecting from one of the jaws and engaging the other jaw on movement of the movable jaw in an opposite direction against the restraint of the first means, for closing of the circuit with said faces spaced apart; and an electrically insulative member mounted on the case adjacent said faces for movement into and out of position between the faces, the second means engaging said other jaw when the member is positioned between said faces.

References Cited in the file of this patent

UNITED STATES PATENTS

| | | |
|---|---|---|
| 3,398 | Spencer | 1891 |
| 522,352 | Poppowitsch | July 3, 1894 |
| 1,267,248 | Monighan | May 21, 1918 |
| 1,337,292 | Timmons | Apr. 20, 1920 |
| 1,834,612 | Gillingham et al. | Dec. 1, 1931 |
| 2,512,158 | Jones | June 29, 1950 |
| 2,580,956 | Reddick | Jan. 1, 1952 |
| 2,627,690 | Kniffer | Feb. 10, 1953 |